UNITED STATES PATENT OFFICE.

MICHAEL F. COUGHLIN, OF STOUGHTON, MASSACHUSETTS, ASSIGNOR TO FREDERIC H. KENNARD, OF NEWTON CENTER, MASSACHUSETTS.

COMPOSITION CONTAINING SULFITE-WASTE AND SHELLAC.

1,103,267.  Specification of Letters Patent.  Patented July 14, 1914.

No Drawing.  Application filed February 2, 1914.  Serial No. 816,044.

*To all whom it may concern:*

Be it known that I, MICHAEL F. COUGHLIN, a citizen of the United States, residing at Stoughton, in the county of Norfolk and State of Massachusetts, have invented certain new and useful Improvements in Compositions Containing Sulfite-Waste and Shellac, of which the following is a specification.

Aqueous solutions of shellac are used in many industries. The alkaline substances determining the solution of the shellac in the water are usually borax, or ammonia, or mixtures of borax and ammonia, but soda or potash, or the alkaline salts of any of the alkali metals, including such salts of ammonia, may be used for dissolving the shellac. I have discovered that waste sulfite liquor, obtained as a by-product of the manufacture of paper pulp from wood, or the residues derived from such liquor by evaporation, may with advantage be incorporated with such alkaline aqueous shellac solutions. The mixture of the two substances in solution, when subsequently dried, furnishes a varnish film of superior luster and having a flexibility superior to that of a film composed of either of the major components singly. By "major components" I mean shellac and waste sulfite liquors, or the solid constituents of the latter. If the solution containing the shellac and sulfite liquor be used as a sizing material rather than as a varnish, the increased flexibility due to the mixture of the two is frequently an advantage.

The composition may be prepared by various methods. For example it may be made by adding the alkaline water solution of one of the major components to a similarly alkaline aqueous solution of the other component; or the shellac may be dissolved directly in the sulfite liquor previously rendered alkaline; or a neutralized solution of sulfite liquor may be added to an aqueous alkaline solution of shellac. The sulfite liquor may be concentrated to any desired degree, or even evaporated to dryness, before incorporation with the shellac. It is obvious that other means may be used to secure the simultaneous presence of shellac, sulfite waste, water and alkali, as by adding to shellac and sulfite liquor a suitable proportion of alkali; or dry shellac and the dried residue of sulfite liquor may be dissolved in water in presence of a sufficient proportion of alkali.

There is of course no necessity for making the sulfite liquor or its evaporated product alkaline, provided there be enough alkali present in the shellac solution to neutralize any acid existing in the sulfite liquor or in the dried residue thereof.

The following is cited as an illustrative example: (1) Ten parts of waste sulfite liquor containing about ten per cent. of solids is neutralized by ammonia. (2) One part of dry shellac is dissolved in water with the aid of ammonia. The solutions (1) and (2) are then poured together and thoroughly mixed. The solutions may be used in equal volumes, or either may preponderate in the mixture.

To prepare a dry sizing material, comprising shellac and a sulfite residue in intimate combination, it is necessary merely to evaporate combined solutions; and such dried product may be again dissolved, to prepare a varnish or a sizing solution, by simple treatment with dilute alkali.

I claim:—

1. The herein-described composition of matter containing shellac and the solid constituents of waste sulfite liquor.

2. The herein-described composition of matter containing shellac and the solid constituents of waste sulfite liquor, in solution in a suitable alkaline medium.

3. The herein-described composition of matter containing shellac and the solid constituents of waste sulfite liquor, in solution in a suitable medium containing ammonia.

In testimony whereof I affix my signature in presence of two witnesses.

MICHAEL F. COUGHLIN.

Witnesses:
 HARRY SNOW,
 CARL T. WOODS.